Patented Sept. 20, 1932

1,877,800

UNITED STATES PATENT OFFICE

RAINALD BRIGHTMAN, OF BLACKLEY, MANCHESTER, ENGLAND, ASSIGNOR TO IMPERIAL CHEMICAL INDUSTRIES LIMITED, OF WESTMINSTER, ENGLAND

AZO DYES AND THEIR PRODUCTION

No Drawing. Application filed February 12, 1930, Serial No. 427,961, and in Great Britain March 13, 1929.

This invention relates to new trisazo dyes having the following characteristic structure $$R_4-N=N-R_1-N=N-R_2-N=N-R_3$$

wherein $R_1$ and $R_2$ represent benzene residues, $R_3$ represents a coupled residue of an azo dye coupling component of the class consisting of sulphonic or carboxylic acids of phenols of naphthols or N-substituted naphthylamines or aminonaphthols, and $R_4$ represents a coupled residue of an azo dye coupling component, and in which the azo groups attached to $R_1$ are in the meta position to each other and the azo groups attached to $R_2$ are in the para position to each other, the said trisazo dyes containing at least two carboxylic or sulphonic acid groups. The characteristic structure of these trisazo dyes is shown in somewhat greater detail in the following formula

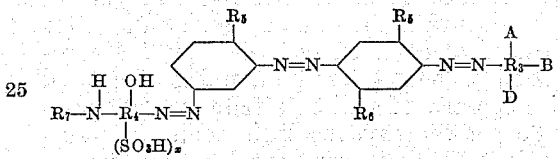

wherein $R_3$ represents a benzene or naphthylamine residue, $R_5$ represents hydrogen, an alkyl or alkoxy group, $R_6$ represents hydrogen or an alkyl group, $R_7$ represents hydrogen, an aryl or acyl group, A represents hydrogen, an amino or substituted amino group, B represents H or OH group, D represents COOH or $SO_3H$ group and $x$ is 1 or 2. These new trisazo dyes have the characteristic property of dyeing regenerated cellulose materials in even level shades. So long as the characteristic structure as set forth ante is retained these dyestuffs produce even level shades on regenerated cellulose materials and by varying the various substituent groups within the limits indicated above various colors and shades may be produced as desired. This is a new and useful feature of my invention. My invention also comprises processes of dyeing regenerated cellulose materials by applying my new trisazo dyes to the same and the dyed regenerated cellulose materials thus produced. Further my invention also relates to certain processes for producing these new trisazo dyes.

I find it advantageous to have the residue represented by $R_4$ comprise a coupled residue of an aminonaphthol sulphonic acid. The residue $R_3$ may be advantageously either a coupled residue of carboxy phenols or naphthylamine sulphonic acids, or naphthol sulphonic acids of aminonaphthol sulphonic acids. A large number of desired shades may be produced on regenerated cellulose materials by using dyes having the substituent groups and radicals varied as indicated above.

Certain trisazo dyes derived from 4:4'-diaminoazo benzene have been described as substantive dyes for the dyeing of cotton (compare for example German Patents 40,740, 72,391 and 72,392) but such dyes do not have the valuable property of giving even dyeings on viscose rayon, that is a regenerated cellulose rayon, which I have found to be characteristic of my trisazo dyes as set forth ante. The trisazo dyes derived from 4:4'-diaminoazo benzene are different from my new trisazo dyes in that they have a different structure. My dyes may be considered to be derived from 3:4'-diaminoazo benzene and this in part accounts for the difference in structure between my new trisazo dyes and the above mentioned prior trisazo dyes.

My new trisazo dyes may be made in various ways. They may be made by tetrazotizing a 3:4'-diaminoazo benzene or a substitution product thereof and coupling with suitable coupling component as herein indicated. Or a diazotized meta-nitro-amine of the benzene series may be coupled with an amine of the benzene series which couples in the para position to the amino group, the 3-nitro-4'-aminoazo benzene thus obtained is diazotized and coupled with one of the specified coupling components and then the resulting nitro disazo dyestuff reduced to convert the nitro group into an amino group, rediazotized and coupled with a second coupling component.

From the above method it is easily seen that it is not a necessary part of this invention to isolate the 3:4'-diamino azo benzene. Either the 3-nitro-4′-aminoazo benzene or the 3:4′-diaminoazo benzene may be used dependent upon which of the two processes is elected to form the final dyestuff.

My invention is very broad in scope. And within the generic structural arrangement there are several sub-generic structural arrangements which are advantageous. The following structural formulæ indicate some of these characteristic sub-generic structures.

I.

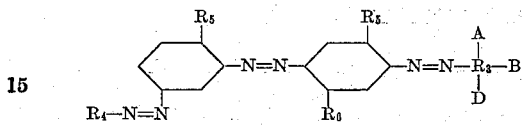

wherein $R_3$ represents a benzene or naphthalene residue, A represents hydrogen an amino or substituted amino group, B represents hydrogen or an OH group, D represents a COOH or $SO_3H$ group, $R_5$ represents H, $CH_3$ or $OCH_3$, $R_6$ represents H or $CH_3$ and $R_4$ represents the coupled residue of an aminonaphthol sulphonic acid.

II.

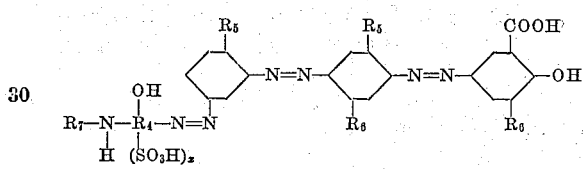

wherein $x$ is 1 or 2.

III.

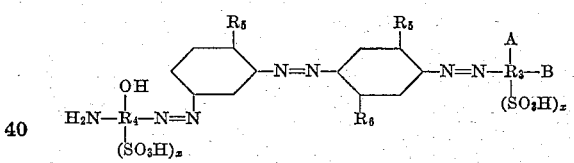

wherein $R_3$ represents a naphthalene residue.

IV.

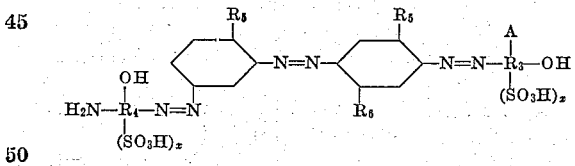

wherein A represents H, or an amino group and $R_3$ represents a naphthalene residue.

V.

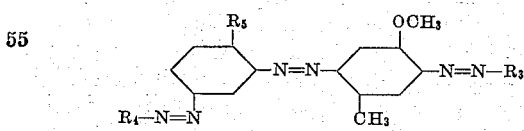

VI.

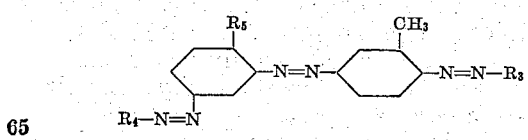

VII.

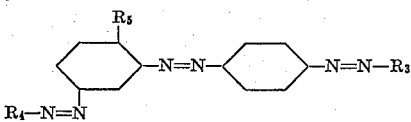

VIII.

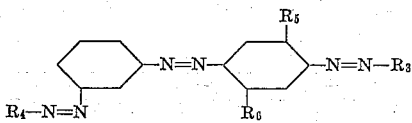

IX.

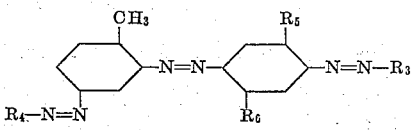

X.

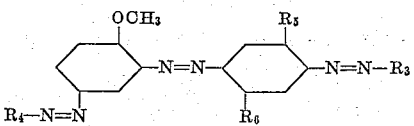

My invention is illustrated but not limited by the following examples, in which the parts are by weight.

*Example 1.*—138 parts of meta-nitroaniline are diazotized in the known manner with 69 parts of sodium nitrite and 250 parts of 36 per cent hydrochloric acid and the diazo-solution is added to a solution containing 187 parts of aniline-ω-sulphonic acid and 136 parts of sodium acetate crystals. The mixture is stirred until coupling is complete when it is heated up and the sulphonic group is hydrolyzed by adding an excess of sodium hydroxide solution and stirring a short time. The mixture is then made neutral and after addition of common salt the 3-nitro-4′-aminoazobenzene is filtered off, and is diazotized with 69 parts of sodium nitrite and 300 parts of 36 per cent hydrochloric acid. The suspension of diazo compound is run into a solution containing 160 parts of sodium salicylate and 400 parts of sodium carbonate. The coupling is maintained alkaline and stirred until combination is complete when it is heated up and about 360 parts of sodium sulphide crystals are added. Stirring is coninue until reduction is complete when the resultant aminodisazo dyestuff is salted out and filtered off. It is then stirred into water and diazotized by the addition of 69 parts of sodium nitrite and 300 parts of 36 per cent hydrochloric acid. The diazo suspension is then stirred into a well cooled solution containing 239 parts of 2-amino-8-naphthol-6-sulphonic acid and 400 parts of solution carbonate. The mixture is maintained alkaline and stirred until coupling is complete when it is heated up and the dyestuff isolated by the addition of common salt. It dyes viscose rayon a reddish-brown shade. This trisazo dye in the form of the free acid may be represented by the following formula

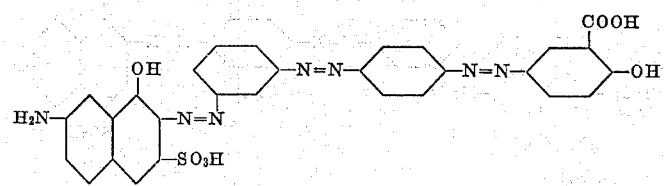

If in place of 239 parts of 2-amino-8-naphthol-6-sulphonic acid in the above example there are used 315 parts of 2-phenylamino-5-naphthol-7-sulphonic acid, the dyestuff obtained dyes viscose rayon a red shade. This trisazo dye in the form of the free acid may be represented by the following formula

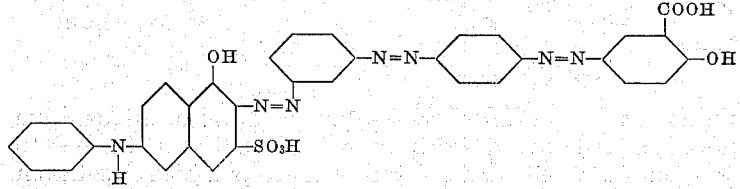

Similarly by the use of 246 parts of sodium 1-naphthol-5-sulphonate in place of 160 parts of sodium sodium salicylate and 315 parts of 2-phenylamino-8-naphthol-6-sulphonic acid in place of 2-amino-8-naphthol-6-sulphonic acid I obtain a dyestuff giving brown dyeings on viscose rayon. This trisazo dye in the form of the free acid may be represented by the following formula:

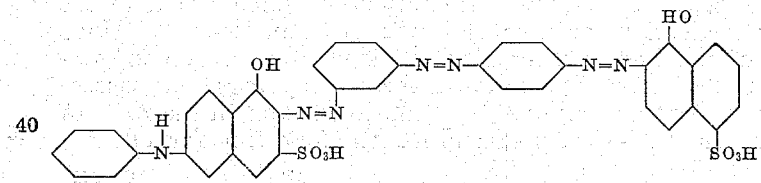

*Example 2.*—138 parts of m-nitroaniline are diazotized in the known manner and the diazo solution is added to a solution of 137 parts of m-amino-p-cresol methyl ether in 100 parts of 36 per cent hydrochloric acid. 136 parts of sodium acetate crystals are added and the mixture is stirred until coupling is complete when the nitroaminoazo dyestuff is filtered off and diazotized with 69 parts of sodium nitrite and 300 parts of hydrochloric acid. The diazo suspension is stirred into a solution of 246 parts of the sodium salt of 2-naphthol-6-sulphonic acid and 400 parts of sodium carbonate. Stirring is continued until coupling is complete, when the mixture is heated up and 360 parts of sodium sulphide crystals are added. After stirring to complete the reduction the amino-disazo dyestuff is salted out by the addition of common salt and filtered. It is then diazotized with 69 parts of sodium nitrite and 300 parts of hydrochloric acid and the diazo suspension is stirred into a cold solution containing 319 parts of 1:8-aminonaphthol-2:4-disulphonic acid. The coupling is maintained alkaline and stirred until combination is complete when it is heated up and the dyestuff isolated by the addition of common salt. It forms a dark powder dyeing viscose rayon a blue shade. This dye has the following formula

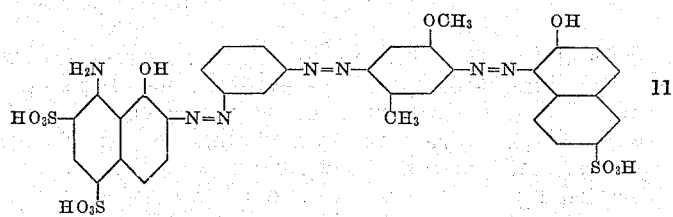

A dyestuff giving somewhat greener dyeings on viscose rayon is obtained by replacing the m-nitroaniline in the preceding example by 169 parts of 4-nitro-o-anisidine and the sodium salt of 2-naphthol-6-sulphonic acid by the sodium salt from a corresponding quantity of 1-naphthol-4-sulphonic acid. This trisazo dye has in the form of the free acid the following formula

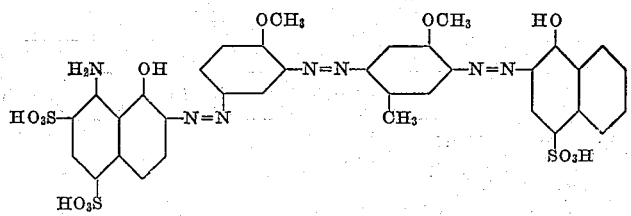

*Example 3.*—169 parts of 4-nitro-2-anisidine are diazotized in the known manner with 69 parts of sodium nitrite and 300 parts of 36 per cent hydrochloric acid and to the diazo solution there is added a solution containing 187 parts of aniline-ω-sulphonic acid, 136 parts of sodium acetate crystals are added and after stirring until coupling is complete the dyestuff is converted by hydrolysis into the nitroaminoazo dyestuff as described in Example 1. The resultant nitroaminoazo dyestuff is filtered off and diazotized with 69 parts of sodium nitrite and 300 parts of 36 per cent hydrochloric acid. The diazo suspension is stirred into a solution containing 152 parts of o-cresotinic acid and 400 parts of sodium carbonate. The coupling is maintained alkaline and stirred until combination is complete, when it is heated up and the dyestuff reduced by the addition of 360 parts of sodium sulphide crystals. When reduction is complete the aminodisazo dyestuff is salted out, filtered off and diazotized with 300 parts of 36 per cent hydrochloric acid and 69 parts of sodium nitrite. The diazo suspension is stirred into a cold solution of 337 parts of sodium 2-phenylamino-8-naphthol-6-sulphonic acid and 400 parts of sodium carbonate. The mixture is maintained alkaline and stirred until coupling is complete when it is heated up and the dyestuff isolated by the addition of common salt. It dyes viscose rayon a yellowish brown shade. This trisazo dye in the form of the free acid may be represented by the following formula

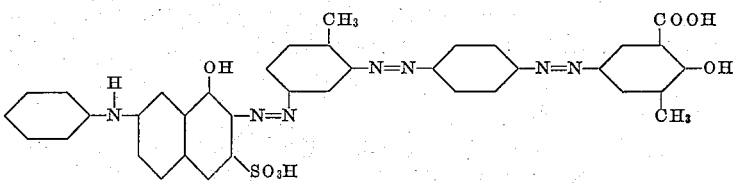

A similar dyestuff is obtained if the 4-nitro-2-anisidine of the above example is replaced by 152 parts of 4-nitro-2-toluidine. This similar dyestuff in the form of the free acid may be represented by the following formula

*Example 4.*—138 parts of m-nitroaniline are diazotized in the usual manner and to the diazo solution there is added a solution containing 107 parts of o-toluidine. 136 parts of sodium acetate crystals are added and stirring is continued until coupling is complete, when the 3-nitro-4'-amino-3'-methylazobenzene is filtered off. The nitroaminoazo dyestuff is diazotized and coupled with 138 parts of salicylic acid (according to the procedure indicated in Example 1). The nitro disazo dyestuff is reduced with sodium sulphide and the resultant aminodisazo dyestuff is diazotized and coupled with 239 parts of 2-amino-8-naphthol-6-sulphonic acid in the manner indicated in Examples 1–3. Upon salting out there is obtained a dyestuff giving yellowish-brown dyeings on viscose rayon. This trisazo dyestuff in the form of the free acid has the following formula

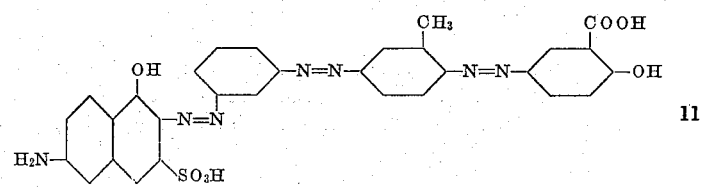

*Example 5.*—242 parts of 3:4'-diamino-5'-methoxy-2'-methylazobenzene are tetrazotized with 300 parts of concentrated hydrochloric acid and 138 parts of sodium nitrite. The suspension of tetrazo compound is stirred into a well cooled solution containing 262 parts of sodium 2-amino-8-naphthol-6-sulphonate and about 600 parts of sodium carbonate. After stirring a short time there is added a solution containing 237 parts

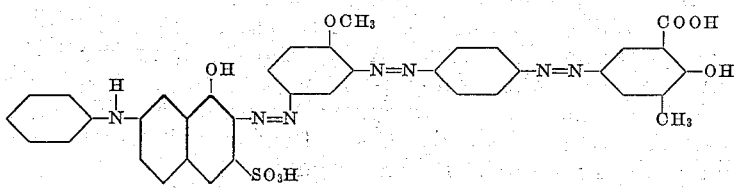

of 2-methylamino-naphthalene-7-sulphonic acid. The coupling is stirred until combination is complete, when it is heated up and the dyestuff precipitated with common salt. It dyes viscose rayon in brownish black shades. This trisazo dye in the form of the free acid may be represented by the following formula

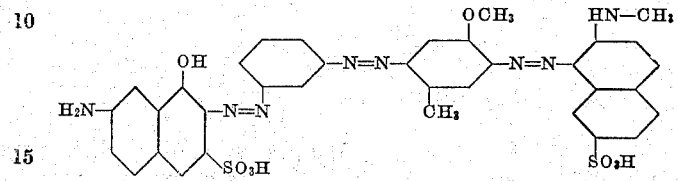

A somewhat similar shade is obtained if in place of the 2-methyl-aminonaphthalene-7-sulphonic acid there is used 319 parts of 2:8-amino-naphthol-3:6-disulphonic acid. This second trisazo dyestuff in the form of the free acid has the following formula

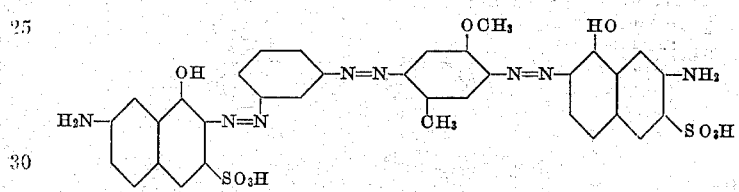

*Example 6.*—242 parts of 3:4'-diamino-5'-methoxy-2'-methylazobenzene are tetrazotized with 300 parts of concentrated hydrochloric acid and 138 parts of sodium nitrite. The suspension of tetrazo compound is stirred into a cold solution of 343 parts of 2-benzoyl-amino-8-naphthol-6-sulphonic acid, containing about 600 parts of sodium carbonate. After stirring for some time a solution containing 239 parts of 19-amino-5-naphthol-7-sulphonic acid is added and stirring is continued until combination is complete. The dyestuff is then salted out with common salt. It dyes viscose rayon in violet blue shades. This trisazo dyestuff in the form of the free acid may be represented by the following formula

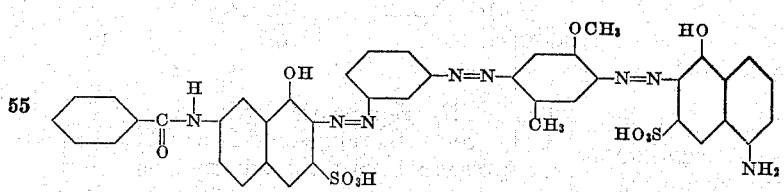

3:4'-diamino-5'-methoxy-2'-methylazobenzene is obtained by coupling m-nitrodiazobenzene with metaaminopara cresolmethyl ether and reducing the 3'-nitro-4'-amino-5'-methoxy-2'-methylazobenzene (brown, m. p. about 163° C.) with sodium sulphide. It forms reddish-brown crystals, which, crystallized from toluene melts at 164–5° C. 3:4-diaminoazobenzene forms brownish crystals and melts at about 210° C. with decomposition. 3-nitro-4'-aminoazobenzene, form orange crystals, melting at 208–209° C.

Having now particularly described and ascertained the nature of my said invention and in what manner the same is to be performed, I declare that what I claim is:—

1. In the manufacture of trisazo dyes having the following formula

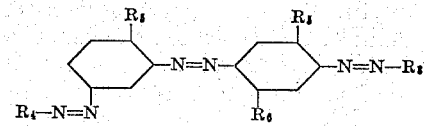

wherein $R_3$ and $R_4$ represent the coupled residues of azo dye coupling components, $R_5$ represents hydrogen, an alkyl or alkoxy group, $R_6$ represents hydrogen or an alkyl group, from 3:4'-substituted azo benzene compounds having the structure

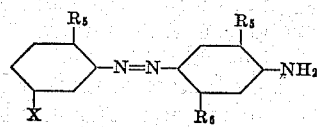

wherein $R_5$ and $R_6$ have the same significance as above and X represents an amino or nitro group, the process which comprises forming an azo group in the 4' position and coupling with an azo dye coupling component and an azo group in the 3 position and coupling with a second azo dye coupling component, when X is an amino group the said azo benzene compound being tetrazotized and coupled with two azo dye coupling components and when X is a nitro group the said azo benzene compound being diazotized and coupled with an azo coupling component, the disazo compound thus obtained reduced to convert said nitro group into an amino group, rediazotized and coupled with a second azo dye coupling component.

2. In the manufacture of trisazo dyes having the following formula

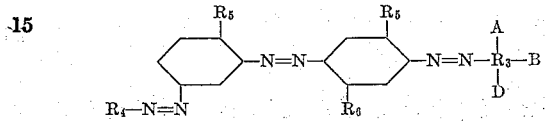

wherein $R_3$ represents a benzene or naphthalene residue, A represents hydrogen, an amino or substituted amino group, B represents hydrogen or OH group, D represents COOH or $SO_3H$, $R_5$ represents H, $CH_3$ or $OCH_3$, $R_6$ represents H or $CH_3$, and $R_4$ represents a coupled residue of an aminonaphthol sulphonic acid from 3:4'-substituted aminoazo benzene compounds having the following structure.

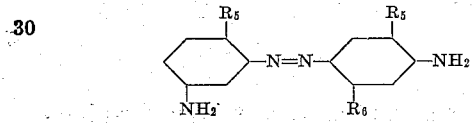

wherein $R_5$ and $R_6$ have the same significance as above, the process which comprises tetrazotizing said 3:4'-substituted azo benzene compound and coupling with one molecular proportion of an aminonaphthol sulphonic acid and one molecular proportion of an azo dye coupling component having the following formula

wherein $R_3$, A, B and D have the same significance as above, and then isolating the trisazo dye thus formed.

3. In the manufacture of trisazo dyes from 3:4'-diamino-5'-methoxy-2'-methyl-azo benzene having the formula

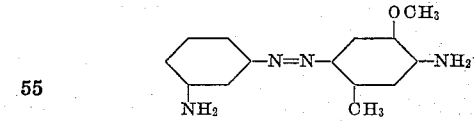

the process which comprises tetrazotizing said azo benzene compound and adding the tetrazo compound thus obtained to a well cooled sodium carbonate solution containing an azo dye coupling component of the class consisting of 2-amino-8-naphthol-6-sulphonic acid and 2-benzoyl-amino-8-naphthol-6-sulphonic acid, stirring the mixture, then adding a solution containing an azo dye coupling component of the class consisting of 2-methyl-amino-naphthol-7-sulphonic acid, 2:8-aminonaphthol, 3:6 disulphonic acid and 1-amino-5-naphthol-7-sulphonic acid, stirring this mixture until coupling is complete and then isolating the trisazo dye thus produced.

4. In the manufacture of trisazo dyes having the following formula

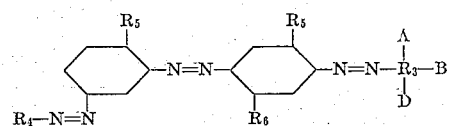

wherein $R_3$ represents a benzene or naphthalene residue, A represents hydrogen, an amino or substituted amino group, B represents hydrogen or a hydroxyl group, D represents a COOH or $SO_3$ group, $R_5$ represents H, $CH_3$ or $OCH_3$ group, $R_6$ represents H, $CH_3$ group and $R_4$ represents the coupled residue of an amino-naphthol sulphonic acid, from 3:4'-substituted azo benzene compounds having the structure

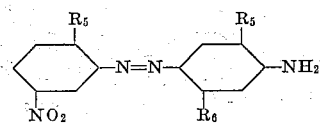

wherein $R_5$ and $R_6$ have the same significance as above, the process which comprises diazotizing the said aminoazo benzene compound, coupling with an azo dye coupling component having the following formula

wherein $R_3$, A, B, and D have the same significance as above, reducing the disazo compound thus produced to convert the nitro group into an amino group, rediazotizing and coupling with an aminonaphthol sulphonic acid, and then isolating the trisazo dye thus obtained.

5. In the manufacture of trisazo dyes having the following formula

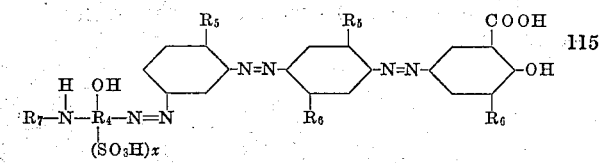

wherein $R_5$ represents hydrogen, $CH_3$ or $OCH_3$ group, $R_6$ represents H or $CH_3$ group, $R_4$ represents a naphthalene residue and $R_7$ represents hydrogen, an acyl or phenyl group, from 3:4'-substituted azo benzene compounds having the formula

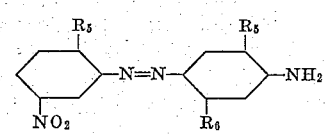

wherein $R_5$ and $R_6$ have the same significance as above, the process which comprises diazotizing said azo benzene compound, coupling with an azo dye coupling component having the following formula

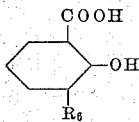

wherein $R_6$ has the same significance as above, reducing the disazo compound so obtained to convert the nitro group into an amino group, rediazotizing and coupling with an aminonaphthol sulphonic acid having the following structure.

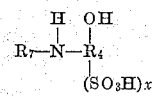

wherein $R_4$ represents a naphthalene residue, $R_7$ represents hydrogen, an acyl or phenyl group and $x$ is 1 or 2, and isolating the trisazo dye thus obtained.

6. In the manufacture of trisazo dyes having the following formula

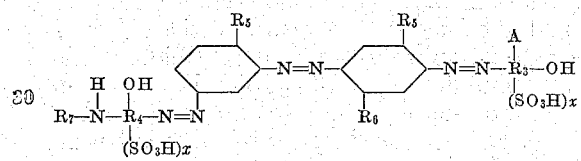

wherein $R_3$ represents a naphthalene residue, A represents hydrogen, an amino or methyl amino group, $R_5$ represents H, $CH_3$ or $OCH_3$ group, $R_6$ represents hydrogen or a $CH_3$ group, $R_4$ represents a naphthalene residue, $R_7$ represents hydrogen, a benzene nucleus or acyl group and $x$ is 1 or 2, from 3:4'-azo benzene compounds having the structure

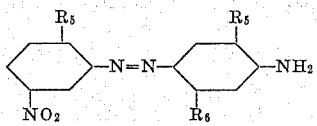

wherein $R_5$ and $R_6$ have the same significance as above, the process which comprises diazotizing said azo benzene compound and coupling with an azo dye coupling component having the following structural formula

wherein A and $x$ have the same significance as above, reducing the disazo compound thus obtained to convert the nitro group into an amino group, rediazotizing and coupling with an azo dye coupling component having the following structural formula

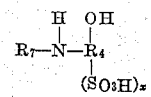

wherein $R_4$, $R_7$ and $x$ have the same significance as above and isolating the trisazo dye thus obtained.

7. As new products, the trisazo dyes having the probable formula

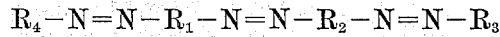

wherein $R_1$ and $R_2$ represent benzene residues, $R_3$ represents the coupled residue of coupling components of the class consisting of sulphonic acid or carboxylic acid derivatives of a phenol or naphthol or of an N-substituted naphthylamine or of an aminonaphthol, and $R_4$ represents the coupled residue of an azo dye coupling component, the azo groups attached to $R_1$ being in meta position respective to each other and the azo groups attached to $R_2$ being in para position with respect to each other, said trisazo dyes being capable of dyeing regenerated cellulose in even level shades.

8. As new products, the trisazo dyes having the probable formula

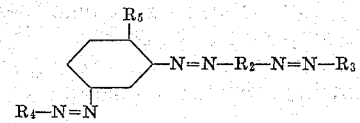

wherein $R_2$ represents a benzene residue, $R_3$ represents the coupled residue of a coupling component of the class consisting of salicylic acid, orthocresotinic acid, aminonaphthol sulphonic acids and N-substituted aminonaphthalene sulphonic acids, and $R_4$ represents an aminonaphthol sulphonic acid and $R_5$ represents H, $CH_3$ or $OCH_3$ and in which the azo groups attached to $R_2$ are in para position with respect to each other, said trisazo dyes being capable of dyeing regenerated cellulose in even level shades.

9. As new products, the trisazo dyes having the following structural formula

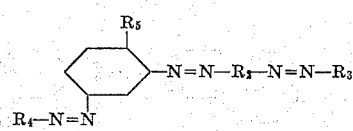

wherein $R_2$ represents a coupled residue of the class consisting of

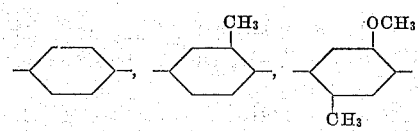

$R_3$ represents a coupled residue of a coupling component of the class consisting of salicylic acid, orthocresotinic acid, 1-naphthol-5-sulphonic acid, 2-naphthol-6-sulphonic acid, 1:4-naphthol-sulphonic acid, 1-amino-5-naphthol-7-sulphonic acid, 2-amino-8-naphthol-3:6-disulphonic acid, and 2-methylamino-naphthalene-7-sulphonic acid, and $R_4$ represents a coupled residue of a coupling component of the class consisting of 2-amino- 8-naphthol-6-sulphonic acid, 2-phenylamino-8-naphthol-6-sulphonic acid, 2-benzoylamino-8-naphthol-6-sulphonic acid, 2-phenyl amino-5-naphthol-7-sulphonic acid, and 1:8-amino-naphthol-2:4-disulphonic acid, $R_5$ represents H, $CH_3$ or $OCH_3$, said trisazo dyestuffs being capable of dyeing regenerated cellulose in even level shades.

10. As new products, trisazo dyes having the following structural formula

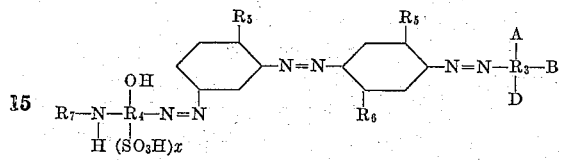

wherein $R_3$ represents a benzene or naphthalene residue, $R_4$ represents a naphthalene residue, $R_5$ represents H, $CH_3$ or $OCH_3$, $R_6$ represents H or $CH_3$, A represents H, an amino or an alkyl substituted amino group, B represents H or OH, D represents COOH or $SO_3H$, $R_7$ represents H, a benzene nucleus or acyl group and $x$ is 1 or 2.

11. As new products, trisazo dyes having the following structural formula

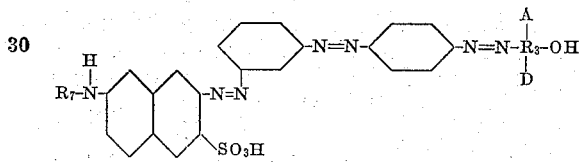

wherein $R_3$ represents a benzene or naphthalene residue, A represents H or an amino group, D represents a COOH or $SO_3H$ group and $R_7$ represents H, a benzene nucleus or acyl group.

12. As new products, trisazo dyes having the following structural formula

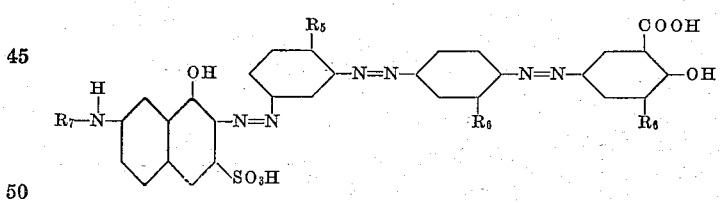

wherein $R_6$ represents H, $CH_3$ or $OCH_3$, $R_5$ represents H or $CH_3$, and $R_7$ represents H or a phenyl group.

13. As new products, trisazo dyes having the following structural formula

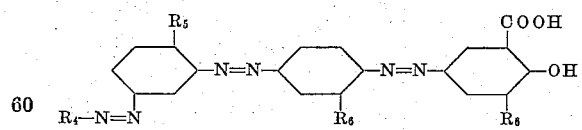

wherein $R_5$ represents H, or an alkyl or alkoxy group, $R_6$ represents H or an alkyl group and $R_4$ represents a coupled residue of an aminonaphthol sulphonic acid.

14. As new products, trisazo dyes having the following structural formula

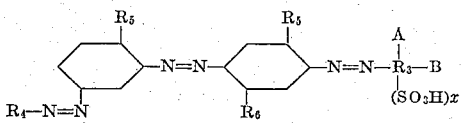

wherein $R_3$ represents a naphthalene residue, A represents H, an amino or substituted amino group, B represents H or OH group, $R_5$ represents H, $CH_3$ or $OCH_3$ group, $R_6$ represents H or $CH_3$ and $R_4$ represents a coupled residue of an aminonaphthol sulphonic acid and $x$ is 1 or 2.

15. As new products, trisazo dyes having the following structural formula

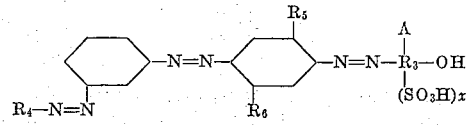

wherein $R_3$ represents a naphthalene residue, A represents H or $NH_2$, $x$ is 1 or 2, $R_5$ represents H, $CH_3$ or $OCH_3$, $R_6$ represents H or $CH_3$, both $R_5$ and $R_6$ being either H or the specified groups and $R_4$ represents a coupled residue of the class consisting of 2-amino-8-naphthol-6-sulphonic acid, 2-phenylamino-8-naphthol-6-sulphonic acid and 1-amino-8-naphthol-2:4-disulphonic acid.

16. As new products, trisazo dyes having the following structural formula

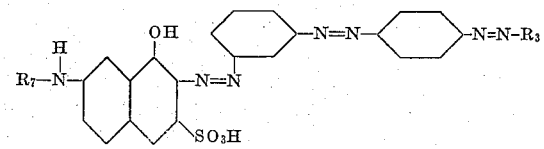

wherein $R_3$ represents a coupled residue of an azo dye coupling component of the class consisting of aminonaphthol sulphonic acids and naphthol sulphonic acids, and $R_7$ represents H or a phenyl group.

17. As new products, trisazo dyes having the following structural formula

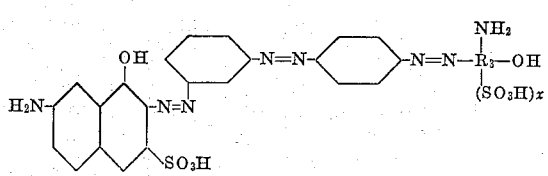

wherein $R_3$ represents a naphthalene residue and $x$ is 1 or 2.

18. As new products, trisazo dyes having the following structural formula

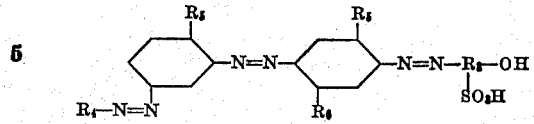

wherein $R_3$ represents a naphthalene residue, $R_6$ represents H or $CH_3$, $R_5$ represents H or $OCH_3$ and $R_4$ represents a coupled residue of an aminonaphthol sulphonic acid.

19. As new products, trisazo dyes having the following structural formula

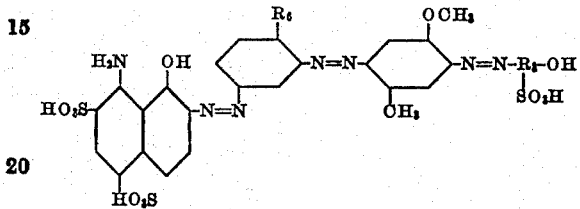

wherein $R_3$ represents a napthalene residue and $R_6$ represents H or $OCH_3$.

In testimony whereof I affix my signature.
RAINALD BRIGHTMAN.